(12) United States Patent
Xia et al.

(10) Patent No.: US 7,985,277 B2
(45) Date of Patent: Jul. 26, 2011

(54) PROCESS FOR EXTRACTING GOLD FROM GOLD-BEARING ORE

(75) Inventors: Chen Xia, Ottawa (CA); Wan-Tai Yen, Kingston (CA)

(73) Assignee: Metal Asia International, Ltd. (CN)

( * ) Notice: Subject to any disclaimer, the term of this patent is extended or adjusted under 35 U.S.C. 154(b) by 0 days.

(21) Appl. No.: 12/281,568

(22) PCT Filed: Mar. 5, 2007

(86) PCT No.: PCT/CA2007/000337
§ 371 (c)(1),
(2), (4) Date: Mar. 6, 2009

(87) PCT Pub. No.: WO2007/098603
PCT Pub. Date: Sep. 7, 2007

(65) Prior Publication Data
US 2010/0116092 A1    May 13, 2010

Related U.S. Application Data

(60) Provisional application No. 60/778,405, filed on Mar. 3, 2006.

(51) Int. Cl.
*C22B 3/04* (2006.01)
(52) U.S. Cl. .......................................... 75/744; 75/722
(58) Field of Classification Search .............. 75/744
See application file for complete search history.

(56) References Cited

U.S. PATENT DOCUMENTS

| | | |
|---|---|---|
| 4,023,961 A | 5/1977 | Douglas et al. |
| 4,070,182 A | 1/1978 | Genik-Sas-Berezowsky et al. |
| 4,167,481 A | 9/1979 | Cremers et al. |
| 4,269,622 A | 5/1981 | Kerley, Jr. |
| 4,369,061 A | 1/1983 | Kerley, Jr. |
| 4,654,078 A | 3/1987 | Perez et al. |
| 4,654,703 A | 3/1987 | Viera |
| 4,913,730 A | 4/1990 | Deschenes et al. |
| 5,279,803 A | 1/1994 | Clough |
| 5,354,359 A | 10/1994 | Wan et al. |
| 5,389,262 A | 2/1995 | Guess |
| 5,536,297 A | 7/1996 | Marchbank et al. |
| 5,785,736 A | 7/1998 | Thomas et al. |

(Continued)

FOREIGN PATENT DOCUMENTS
CN    1818098    8/2006
(Continued)

OTHER PUBLICATIONS

Mishra, B. "Hydrometallurgical Processes" from "Extractive Metallurgy". ASM Handbooks Online. http://products.asminternational.org/hbk/index.jsp. 2002.*

(Continued)

*Primary Examiner* — George Wyszomierski
*Assistant Examiner* — Tima M McGuthry-Banks
(74) *Attorney, Agent, or Firm* — Rader, Fishman & Grauer PLLC (57) ABSTRACT

A process for extracting gold from a gold-bearing ore. The process includes, first, providing a leaching liquor with thiosulfate anion and ethylenediamine. Next, the leaching liquor is contacted with the gold-bearing ore to form a pregnant leach solution including gold dissolved from the gold-bearing ore. Finally, at least part of the gold in the pregnant leach solution is recovered.

24 Claims, 6 Drawing Sheets

U.S. PATENT DOCUMENTS

| | | | |
|---|---|---|---|
| 5,916,534 | A | 6/1999 | Butler |
| 6,344,068 | B1 | 2/2002 | Fleming et al. |
| 6,500,231 | B1 | 12/2002 | Wan |
| 6,632,264 | B2 | 10/2003 | Zhang et al. |
| 6,660,059 | B2 | 12/2003 | Ji et al. |
| 7,004,326 | B1 | 2/2006 | Dai et al. |
| 7,704,298 | B2 * | 4/2010 | Ji et al. ............................ 75/744 |
| 2003/0154822 | A1 | 8/2003 | Hall et al. |
| 2004/0115108 | A1 | 6/2004 | Hackl et al. |
| 2004/0200207 | A1 | 10/2004 | McKelvey et al. |
| 2004/0206207 | A1 | 10/2004 | Ji et al. |
| 2004/0237721 | A1 | 12/2004 | Baghalha |
| 2007/0014709 | A1 | 1/2007 | Moyes et al. |

FOREIGN PATENT DOCUMENTS

| | | |
|---|---|---|
| WO | WO 2005/017215 | 2/2005 |
| WO | WO 2007/098603 | 9/2007 |
| WO | 2007/115399 | 10/2007 |

OTHER PUBLICATIONS

Aylmore and Muir, "Thiosulfate leaching of gold: A review", Minerals Engineering, 14(2): 135-174 (2001).

Fleming, C.A., et al., "Recent advances in the development of an alternative . . . resin in pulp", Minerals & Metallurgical Processing, 20(1): 1-9 (2003).

Klut, "The recovery of gold, silver and platinum residues", Pharmazeutische Zeitung, 52:168 (1907), English Abstract.

Klut, "The recovery of gold, silver and platinum residues", Pharmazeutische Zeitung, 52:168 (1907), English translation.

Klut, "The recovery of gold, silver and platinum residues", Pharmazeutische Zeitung, 52:168 (1907), German paper.

Muir, D.M., et al., "Thiosulfate as an alternative to cyanide . . . impediments", Mineral Pro. & Extractive Metallurgy (Trans. Inst. Min. Metall. C), 113:C2-C12 (Mar. 2004).

Nicol, M., et al., "Recovery of gold from thiosulfate solutions and . . . resins", Cyanide: social, industrial and economic aspects. TMS, Warrendale, PA, 469-483 (2001).

Stanley, Norm, "Make your own chemicals: Recovery of gold", www.sas.org/E-Bulletin/2003-10-31/labnotes2/body.html, (2003).

Wassink, B., et al., "Leaching of a gold ore using the hydrogen sulfide-bisulfide-sulfur system", Met.Soc. CIM, Alberta: 225-241 (2005).

West-Sells, P.G., et al., "A novel thiosulfate leach process for the treatment of carbonaceous gold ores", Met.Soc. CIM, Alberta: 209-223 (2005).

Xia, C., et al., "Iron sulfide minerals in thiosulfate-gold leaching: some problems and solutions", Met.Soc. CIM, Alberta: 259-278 (2005).

Zhang, H. et al., "An electrochemical study of an alternative process . . . thiosulfate solutions", Met.Soc. CIM, Alberta: 243-257 (2005).

Hydrometallurgy 2008; Proceedings of the Sixth International Symposium; Published by the Society for Mining, Metallurgy, and Exploration, Inc.; 12 pages.

Proceedings of XXIV International Mineral Processing Congress; Beijing, China Sep. 24-28; vol. 2; 2008; 15 pages.

* cited by examiner

FIG. 6

PROCESS FOR EXTRACTING GOLD FROM GOLD-BEARING ORE

This application is a 371 of PCT/CA07/00337 filed Mar. 5, 2007, which claims benefit of 60/778,405 filed Mar. 3, 2006.

FIELD OF THE INVENTION

This invention is related to a process for extracting gold from gold-bearing ore.

BACKGROUND OF THE INVENTION

Various leaching processes are known for extracting precious metals (e.g., gold, platinum, silver) from various minerals. (For the purposes hereof, a "precious metal" is defined as including any of gold, platinum, and silver.) For example, in a known process to extract gold, a leaching liquor dissolves gold from an ore into a stable solution phase containing gold ligand (i.e., lixiviants). The prior art processes typically also include a step or series of steps in which the dissolved gold is collected by a recovery process, to produce solid gold metal.

Usually, the most important criteria in evaluating leaching processes are the rate of gold extraction (usually expressed as a percentage) and reagent consumption (e.g., in the prior art thiosulfate leaching processes, $Na_2S_2O_3 \cdot 5H_2O$ or $(NH_4)_2S_2O_3$).

In the prior art, the most commonly used lixiviant is cyanide salts. Cyanidation, however, has a number of problems. For example, cyanide is an extremely toxic chemical which, if released into the environment, may cause serious environmental damage.

Also, cyanidation does not work well with carbonaceous ores. In the prior art, the usual treatment of carbonaceous ores has involved a step of roasting the carbonaceous ores, to eliminate the carbonaceous matter before cyanidation. However, the roasting processes of the prior art are potentially harmful to the environment.

In order to address these problems, thiosulfate has been proposed as an alternative lixiviant to cyanide. Thiosulfate prevents the adsorption of gold onto the surface of carbonaceous materials, and thiosulfate is generally not particularly harmful to the environment.

One approach proposed in the prior art is to use a thiosulfate-copper-ammonia leaching system, and a typical example thereof is disclosed in U.S. Pat. No. 4,654,078 (Perez et al.) However, ammonia also can result in environmental damage, if not properly controlled. In addition, if not properly controlled in a processing facility, ammonia can cause certain occupational health problems.

There is therefore a need for an effective and stable leaching system which is significantly less harmful to the environment.

SUMMARY OF THE INVENTION

In its broad aspect, the invention provides a process for extracting gold from a gold-bearing ore. The process includes, first, providing a leach liquor comprising thiosulfate anion and ethylenediamine. Next, the leaching liquor is brought into contact with the gold-bearing ore to form a pregnant leach solution including gold dissolved from the gold-bearing ore. Finally, at least part of the gold is recovered from the pregnant leach solution.

In another of its aspects, the leaching liquor includes dissolved copper ion.

In yet another aspect, the ratio of ethylenediamine to copper is about 3:1.

In another of its aspects, the invention provides a process which begins with providing a leaching liquor comprising thiosulfate anion and ethylenediamine, and providing an ion exchange resin. Next, the leaching liquor and the ion exchange resin are brought into contact with the gold-bearing ore to form a loaded resin including gold dissolved from the gold-bearing ore. In the next step, the leaching liquor and the loaded resin are screened to separate the leaching liquor and the loaded resin. Finally, at least part of the gold is recovered from the loaded resin.

In another of its aspects, the invention provides a process which commences with providing a leaching liquor comprising thiosulfate anion, ethylenediamine, and ammonia. Next, the leaching liquor is brought into contact with the gold-bearing ore to form a pregnant leach solution comprising gold dissolved from the gold-bearing ore. Finally, at least part of the gold is recovered from the pregnant leach solution.

In another of its aspects, the invention provides a process starting with providing a leaching liquor comprising copper ion, thiosulfate anion, ethylenediamine, and ammonia. Next, the leaching liquor is contacted with the gold-bearing ore to form a pregnant leach solution including gold dissolved from gold-bearing ore. Finally, the process includes recovering at least part of the gold from the pregnant leach solution.

BRIEF DESCRIPTION OF THE DRAWINGS

The invention will be better understood with reference to the drawings, in which.

DETAILED DESCRIPTION

Figure 1:
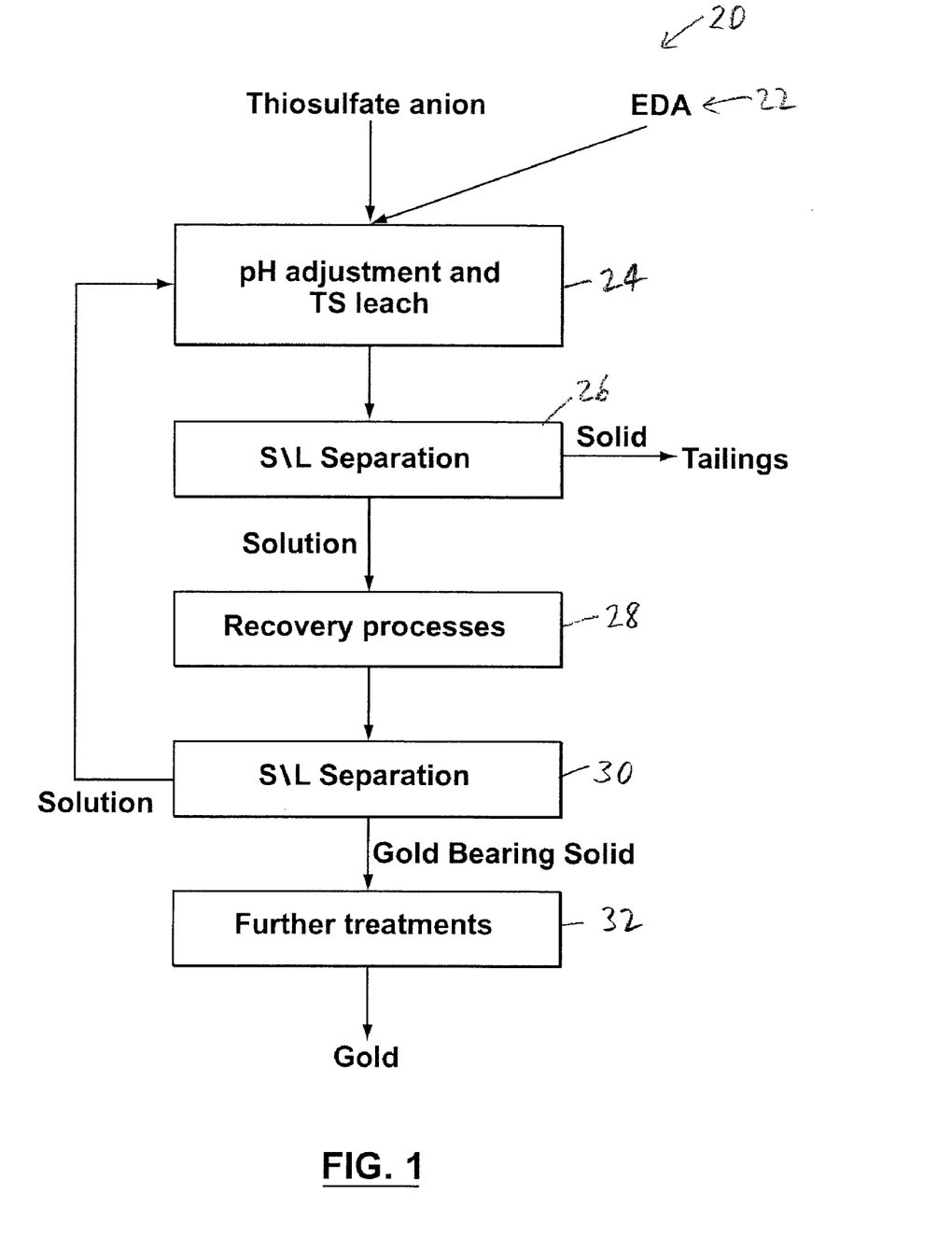
FIG. 1 is flow diagram outlining an embodiment of the process of the invention.

Reference is first made to FIG. 1 to describe an embodiment of a process for extracting gold from gold-bearing ore in accordance with the invention indicated generally by the numeral 20. Preferably, the process begins with a step 22 (FIG. 1) in which a leaching liquor is provided which includes thiosulfate anion and ethylenediamine (also referred to herein as "EDA" or "en").

As can be seen in FIG. 1, in the next step, the pH is adjusted (as will be described), and the thiosulfate leach proceeds (step 24). In step 24, the leaching liquor is brought into contact with the gold-bearing ore to form a pregnant leach solution including gold dissolved from the gold-bearing ore. After leaching, the leaching liquor is subjected to a solids/liquid separation (step 26). The solids proceed to tailings and the solution resulting from the solids/liquid separation of step 26 proceeds to step 28 in which the solution is subjected to recovery processes. At least part of the gold in the pregnant leach solution is recovered in the recovery processes. The recovery processes are any suitable processes, as will also be described.

In step 30, another step of solids/liquid separation takes place. The barren solution (i.e., a recycle leach solution) resulting from the solids/liquid separation of step 30 is returned to the beginning of the process (step 24), i.e., the recycle leach solution is recycled into the leaching liquor.

The solids are gold-bearing solids which are subjected to any suitable further treatment(s) (step 32), and as can be seen in FIG. 1, a solid gold metal ultimately results from the process.

Preferably, the concentration of thiosulfate in the leaching liquor is between about 0.001 mol/liter and about 0.5 mol/liter.

Figure 2:
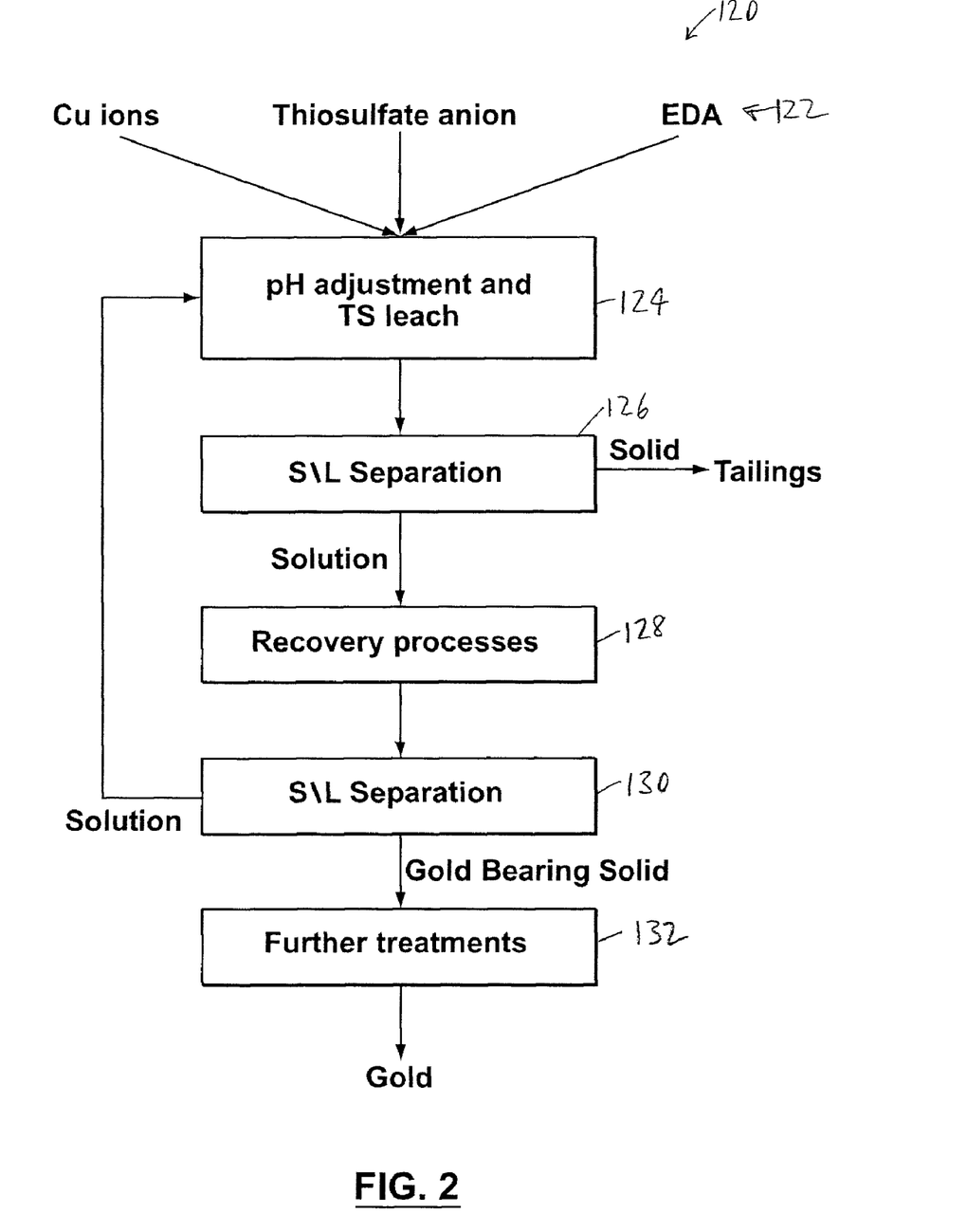
FIG. 2 is a flow diagram illustrating an alternative embodiment of the process of the invention.

An alternative embodiment, illustrated in FIG. 2, is another process 120 for extracting gold from gold-bearing ore in accordance with the invention. In this embodiment, the process begins with a step 122 in which copper ion, thiosulfate anion, and ethylenediamine are included in a leaching liquor. In the embodiment illustrated in FIG. 2, the concentration of copper ion in the leaching liquor is between about 0.00001 mol/liter and about 0.05 mol/liter.

Also, in the process 120, the ratio of EDA to copper preferably is between about 2:1 and about 3:1. However, a higher ratio of EDA to copper can also be advantageous, i.e., if it is economically feasible and environmentally permitted. A ratio lower than 2:1 is also permitted, but not suggested, as such a lower ratio would generally provide less than optimal results. As will be described, it has been determined that even small amounts of copper are beneficial. In certain cases, it has been found that, without any addition of copper per se to the solution, trace amounts of copper which are leached from the ore during the leaching step may be sufficient.

It has been determined that the method of the invention can be used in very high alkalinity. Preferably, the leaching liquor has a pH of at least about 5. More preferably, the leaching liquor has a pH of at least about 6.

INDUSTRIAL APPLICABILITY

In use, in one embodiment, the leaching liquor is prepared, and thiosulfate anion and EDA are included in the leaching liquor. Next, if appropriate, the pH is adjusted so that it is above the minimum of 5, and leaching proceeds. Subsequent to leaching, the mixture of solid and solution (also called the pulp) is subjected to a solids/liquid separation. The solids from this separation step are sent to tailings, and the solution (also called the pregnant solution) is subjected to recovery processes.

For instance, resin exchange technology can be used to recover gold from the pregnant solution. Also, metal cementation technologies and various precipitation technologies can be applied to the pregnant solution, which contains virtually no solid particles, or only trace amounts of solid particles for gold recovery purposes.

The barren solution can be disposed of or recycled to the next leaching circuit. The solution pH is preferably adjusted to optimum conditions. The recycled solution is preferably refilled with water, thiosulfate anion, copper ion, and EDA as required.

As indicated above, in an alternative embodiment, copper ions are included with the leaching liquor during leaching. The copper may be added to the leaching liquor before leaching commences, or the copper may be dissolved from the ore during leaching.

The decomposition of EDA is normally slow. One of the decomposition products of EDA is ammonia or ammonium anion, in a significant percentage. One consequence of this is that ammonia will accumulate in recycled solution (i.e., the more the solution is recycled, the more ammonia it will contain). Unless the ammonia is concentration higher enough to result in an elevated thiosulfate consumption it is harmless or even beneficial to the leaching reactions.

Figure 3:
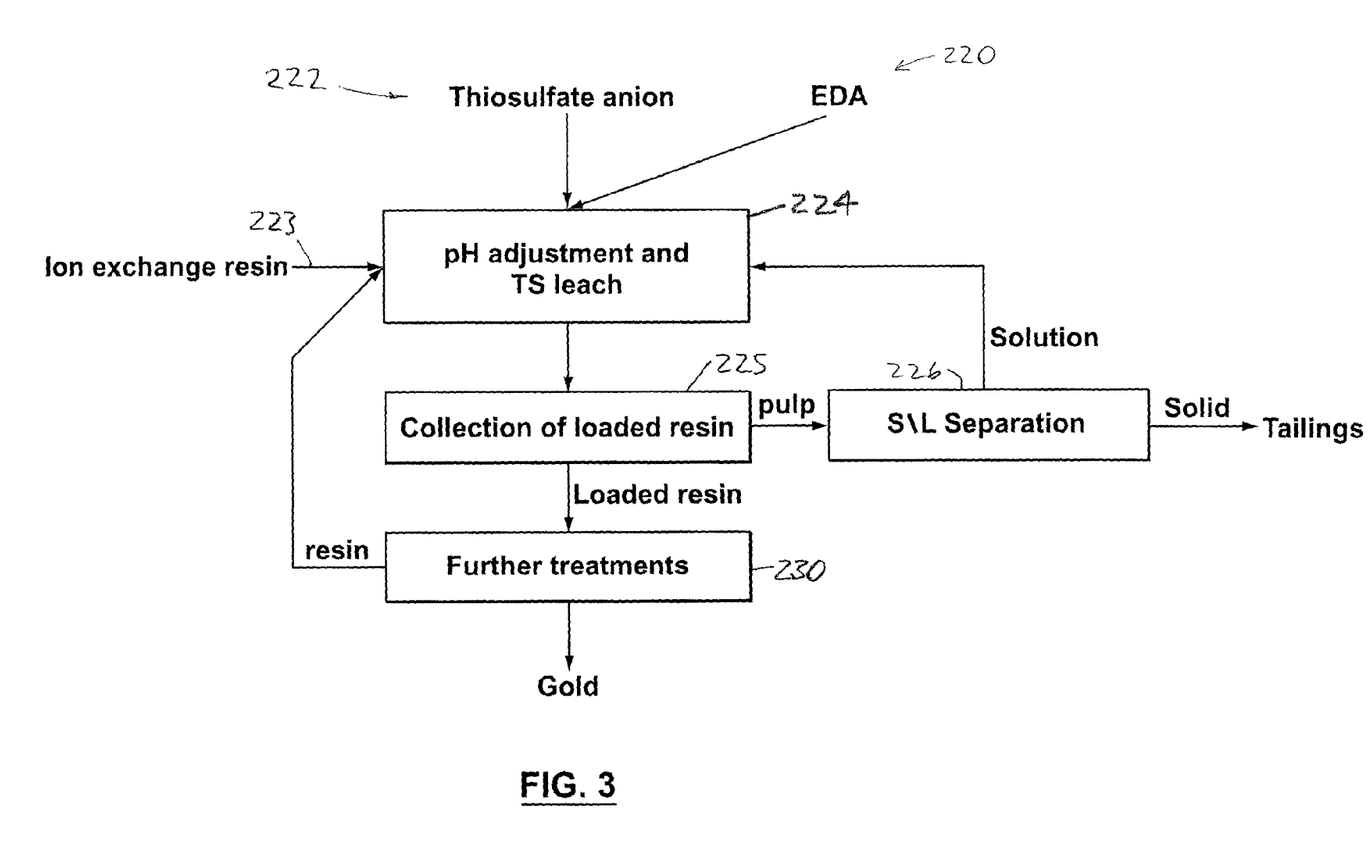
FIG. 3 is a flow diagram illustrating another alternative embodiment of the invention.

In another alternative embodiment illustrated in FIG. 3, a process 220 begins with a step 222 in which a leaching liquor is provided which includes thiosulfate anion and EDA. Resin beads (referred to as "ion exchange resin") containing substantially no gold (i.e., no gold, or trace amounts of gold) are also filled into the pulp (step 223).

In the next step, the pH is adjusted, and the thiosulfate leach proceeds (step 224). The leaching liquor and the ion exchange resin are brought into contact with the gold-bearing ore to form a loaded resin which includes gold dissolved from the gold-bearing ore. After leaching, the leaching liquor is subjected to a screening operation (step 225). Substantially all, or most, resin beads are separated from ore particles and the leaching solution.

The pulp (the mixture of ore particles and leaching solution) is subjected to a solids/liquid separation (step 226) so that the collected solids can be disposed to tailings and the barren solution containing virtually no solids (or trace amounts of solids) can be disposed of, or recycled to the leaching step.

After screening, the loaded resin (resin beads containing significant amount of gold on the surfaces) are subjected to further (recovery) operations (step 230), such as elution and regeneration, so that gold attached on the resin beads can be collected for the production of gold metal. This step provides a recycle ion exchange resin. The resin beads (i.e., the recycle ion exchange resin) are then reused in the first step of the flow sheet (FIG. 3).

Figure 4:
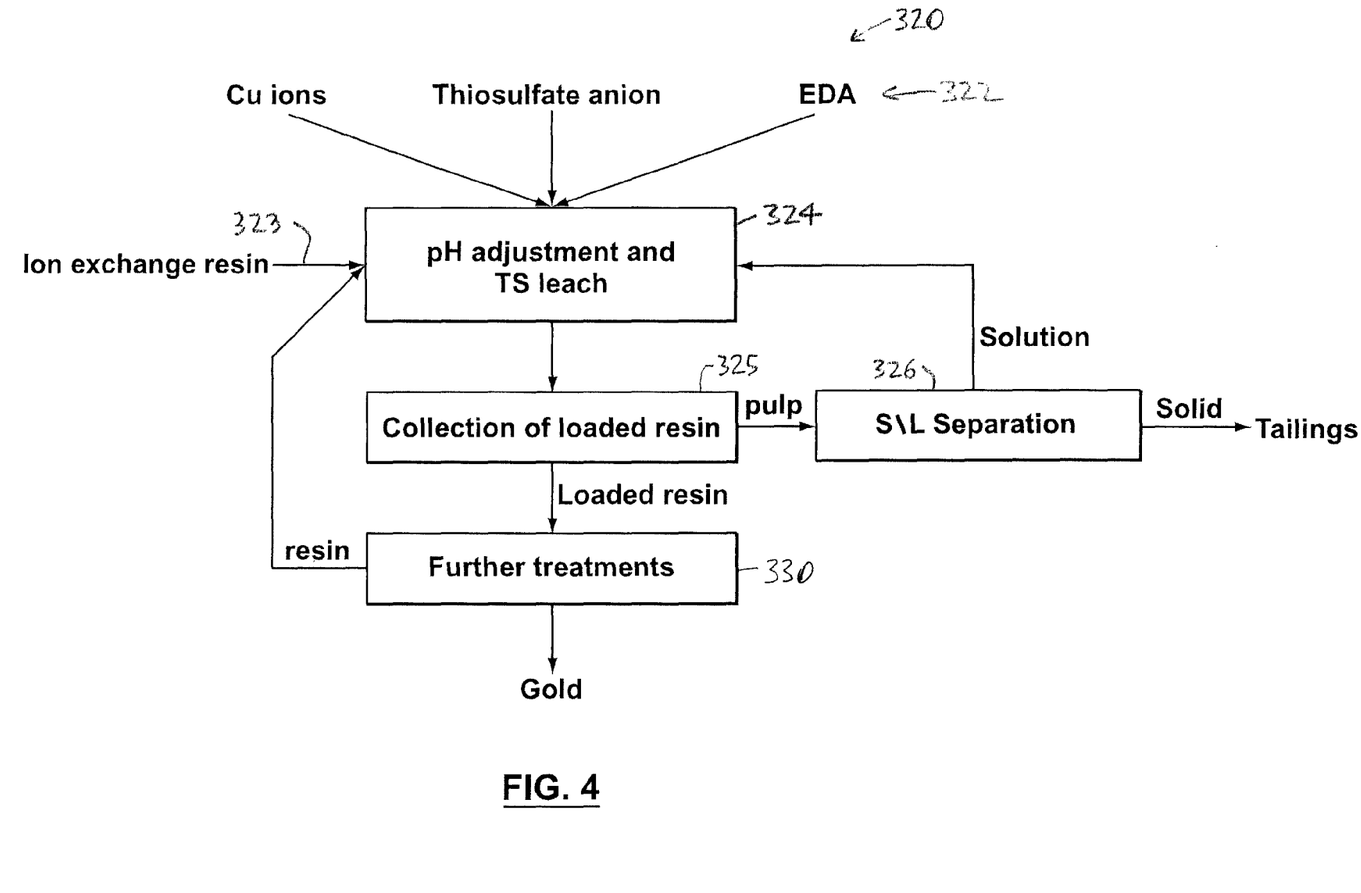
FIG. 4 is a flow diagram illustrating another alternative embodiment of the invention.

Various combinations of the embodiments of the process of the invention described above (or portions thereof, as the case may be) are feasible. For example, as illustrated in FIG. 4, in another embodiment of the process 320, a leaching liquor including thiosulfate anion, EDA, and dissolved copper ions is used with an ion exchange resin which is filled into the pulp in step 323.

In the next step, the pH is adjusted, and the thiosulfate leach proceeds (step 324). The leaching liquor and the ion exchange resin are brought into contact with the gold-bearing ore to form a loaded resin which includes gold dissolved from the gold-bearing ore. After leaching, the leaching liquor is subjected to a screening operation (step 325). Substantially all, or most, resin beads are separated from ore particles and the leaching solution.

The pulp (the mixture of ore particles and leaching solution) is subjected to a solids/liquid separation (step 326) so that the collected solids can be disposed to tailings and the barren solution containing virtually no solids (or trace amounts of solids) can be disposed of, or recycled to the leaching step.

After screening, the loaded resin (resin beads containing significant amount of gold on the surfaces) are subjected to further (recovery) operations (step 330), such as elution and regeneration, so that gold attached on the resin beads can be collected for the production of gold metal. This step provides a recycle ion exchange resin. The resin beads (i.e., the recycle ion exchange resin) are then reused in the first step of the flow sheet (FIG. 4).

Figure 5:
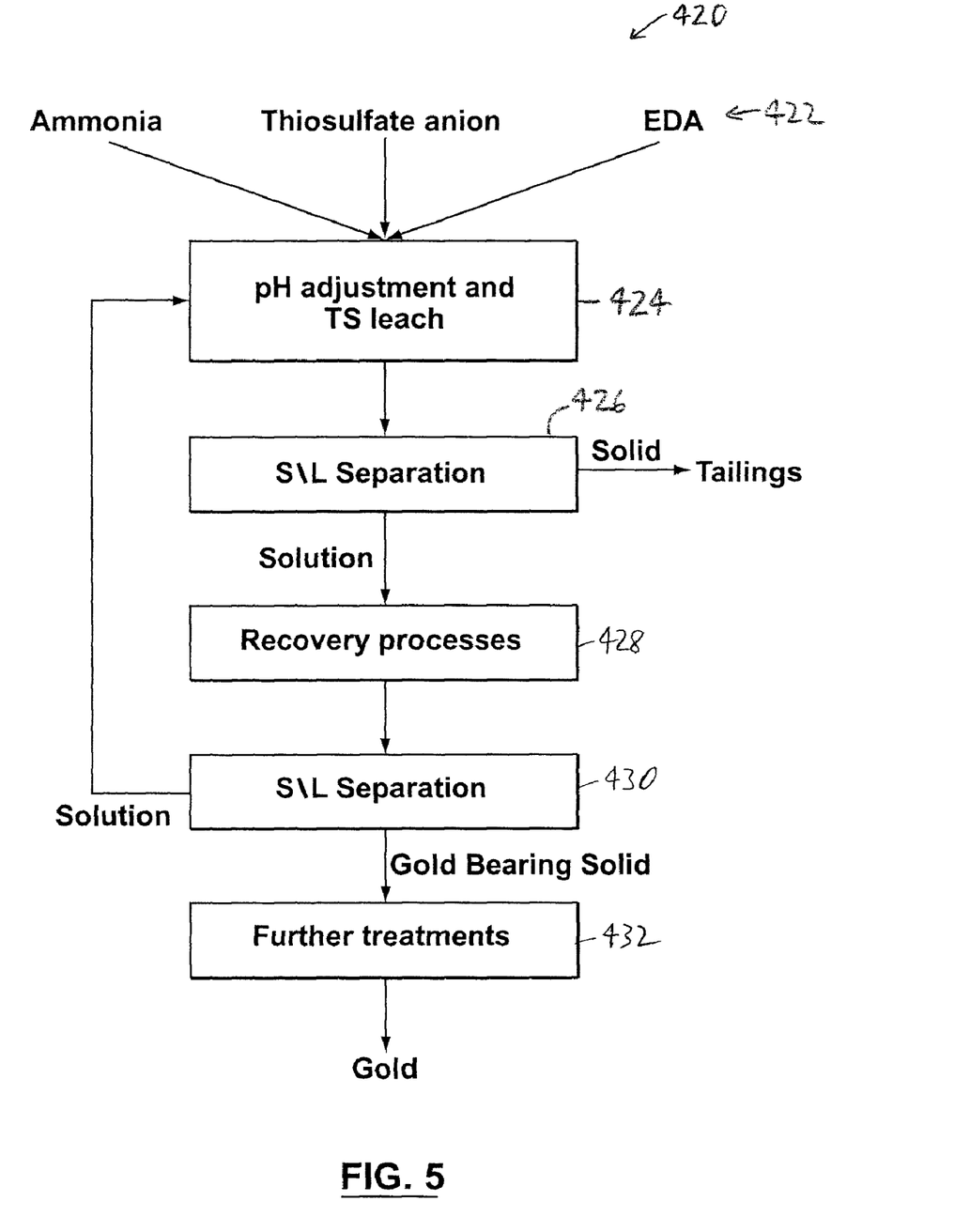
FIG. 5 is a flow diagram illustrating another alternative embodiment of the invention.

Another alternative embodiment of the invention is disclosed in FIG. 5. The process 420 preferably begins with a step 422 in which a leaching liquor is provided which includes thiosulfate anion, EDA, and ammonia. The ammonia may be added, for example, if thiosulfate is added in the form of ammonium thiosulfate in the leaching liquor. Alternatively, ammonia may be added to the leaching liquor in the form of ammonium hydroxide. In addition, and as described above, ammonia or ammonium ion is a decomposition product of EDA. Although the decomposition of EDA normally proceeds at a relatively slow rate, the ammonia in the leaching liquor may be provided by recycled leaching liquor.

Where ammonia is added to the leaching liquor (i.e., ammonium thiosulfate, or ammonium hydroxide), it preferably is added only to the extent that the ammonia is not more than about 1 mol/L.

In the next step the pH is adjusted, and the thiosulfate leach proceeds (step 424). In step 424, leaching liquor is brought into contact with the gold-bearing ore to form a pregnant leach solution including gold dissolved from the gold-bearing ore. After leaching, the leaching liquor is subjected to a solids/liquid separation (step 426). The solids proceed to tailings and the solution resulting from the solids/liquid separation of step 426 proceeds to step 428 in which the solution is subjected to recovery processes. At least part of the gold in the pregnant leach solution is recovered in the recovery processes.

In step 430, another step of solids/liquid separation takes place. The barren solution (i.e., a recycle leach solution) resulting from the solids/liquids separation of step 430 is returned to the beginning of the process (step 424), i.e., the recycle leach solution is recycled into the leaching liquor.

The solids are gold-bearing solids which are subjected to further treatments (step 432), and a solid gold metal ultimately results from the process.

Figure 6:
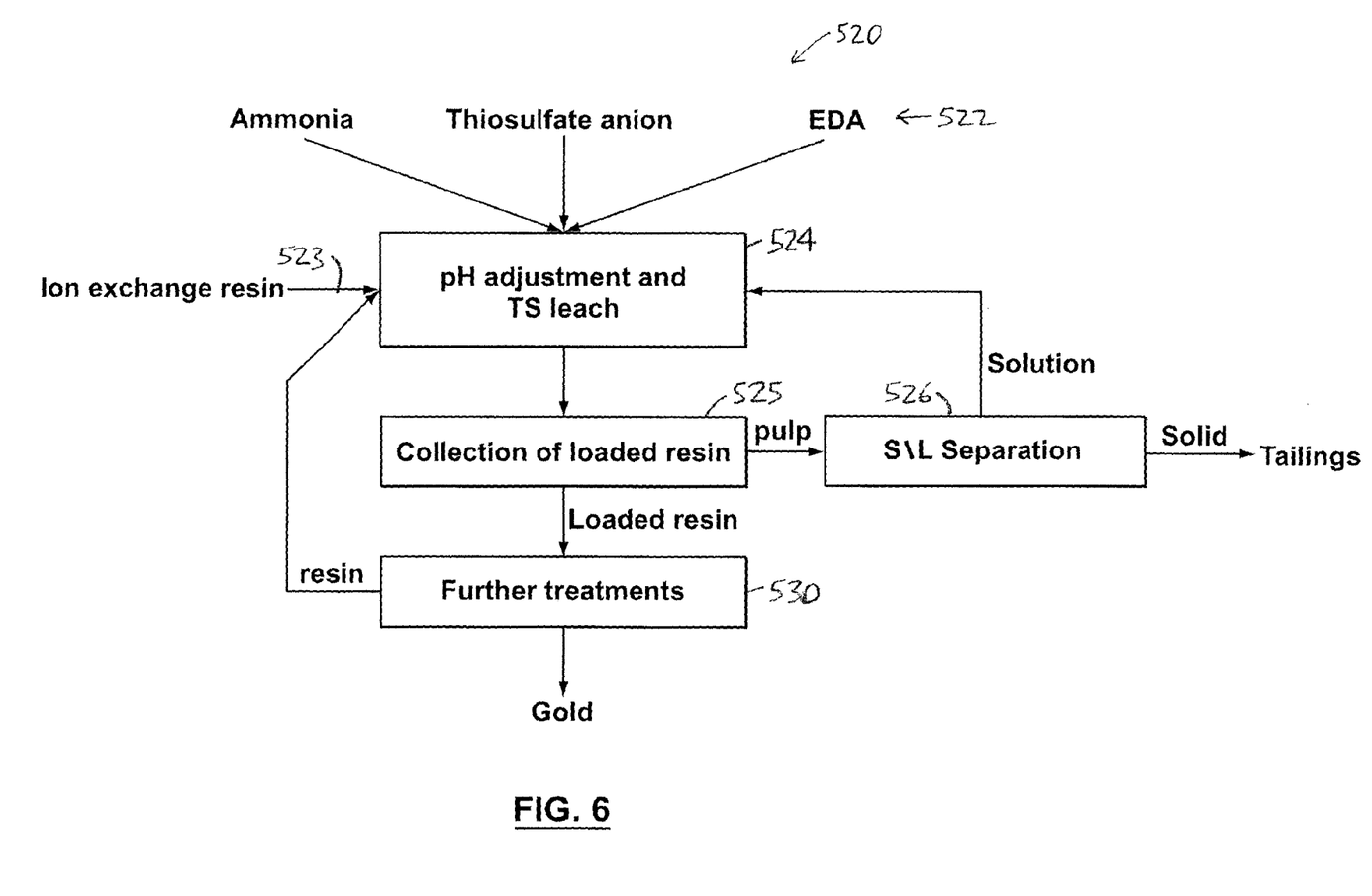
FIG. 6 is a flow diagram illustrating another alternative embodiment of the invention.

Another alternative embodiment of the invention is a process 520 illustrated in FIG. 6. In the process 520, a leaching liquor including thiosulfate anion, EDA, and ammonia is used with an ion exchange resin which is filled into the pulp in step 523.

In the next step, the pH is adjusted, and the thiosulfate leach proceeds (step 524). The leaching liquor and the ion exchange resin are brought into contact with the gold-bearing ore to form a loaded resin which includes gold dissolved from the gold-bearing ore. After leaching, the leaching liquor is subjected to a screening operation (step 525). Substantially all, or most, resin beads are separated from ore particles and the leaching solution.

The pulp (the mixture of ore particles and leaching solution) is subjected to a solids/liquid separation (step 526) so that the collected solids can be disposed to tailings and the barren solution containing virtually no solids (or trace amounts of solids) can be disposed of, or recycled to the leaching step.

After screening, the loaded resin (resin beads containing significant amount of gold on the surfaces) are subjected to further (recovery) operations (step 530), such as elution and regeneration, so that gold attached on the resin beads can be collected for the production of gold metal. This step provides a recycle ion exchange resin. The resin beads (i.e., the recycle ion exchange resin) are then reused in the first step of the flow sheet (FIG. 6).

EXAMPLES

Further illustrations of the invention are provided in the following examples.

All reagents used in the following examples were of analytical grade. $Cuen_2$ was prepared in solution by dissolving EDA and copper sulfate at the molecular ratio of 2:1 in distilled water. The dissolution of copper is fast and the solution is stable over an extended period. Pure EDA tends to evaporate and will adsorb carbon dioxide from air. EDA's aqueous solution, however, is very stable. Accordingly, an EDA solution was prepared and stored in a sealed flask. The concentrations of copper and EDA were 0.06 M and 0.12 M respectively. A 0.12 M EDA solution without copper was also prepared and stored.

The Samples

Three gold ores were tested in this leaching system. Sample A was a high grade pure silicate gold ore.

The composition: Au 16.28 g/t, Fe (oxide) 0.18%, Cu (oxide) 0.002%, C 0.19%, S 0%.

Sample B was a mild refractory copper-bearing sulfidic gold ore.

The composition: Au 3.12 g/t, Pyrite 10.4%, Iron oxide 5.1%, Chalcopyrite 0.5%, Galena 0.06%.

An autoclaved gold ore was also tested with this system as Sample C. The gold head was about 6.80 g/t.

As further discussed below, synthetic gold ores were prepared by mixing the pure silicate gold ore (Sample A) with certain mineral impurities. The pure natural sulfide minerals were purchased from a commercial supplier.

Natural pyrite: Fe 48.27%, S 51.6%, As 87.67 ppm, Cr 256 ppm, Cu 62.92 ppm

Natural pyrrhotite: Fe 47.05%, S 28.72%, Cu 0.87%, Mn 0.22%, Pb 0.12%, Zn 1.08%

The ore samples and additional minerals were pulverized to 90% and 97%-200 mesh respectively. Sample A was stored for an extended period after grinding. However, Sample B was used immediately after grinding to avoid inconsistency due to the ageing effects. Sample C presented as a wet filtration cake containing fine particles. All additional sulfide minerals were freshly prepared by the pulverizer.

The Testing Process

The leaching tests were carried out in glass jars located on the top of an orbital shaker that was rotating at 210 rpm during the leaching. Caps were loosely placed but not sealed on top of each jar so that sufficient air was supplied and the evaporation of water was not significant.

The mixture of chemicals, fine mineral particles and water was placed into the jar. The total volume of solution was 100 ml for all tests. The pulp density was 33.3% for all tests. The solution pH was adjusted as required to maintain pH at about 6 or greater.

In each case, the solution was agitated for an extended period. The solution was collected after filtration. The thiosulfate concentration was analyzed with iodine titration. The gold composition in the solution phase was determined by the atomic adsorption spectrometry method. The gold composition in the solid residue was analyzed by a standard fire assay method except that the solid residue of Sample C was dissolved in aqua regia solution and then analyzed using the atomic adsorption spectrometry method.

Results of the Testing

First Study (Sample A): The following are the results of a comparison study on the traditional thiosulfate-copper-ammonia leaching system and the EDA-assisted leaching system of the invention for Sample A.

In experiment 1-1, the leaching solution conditions were: $(NH_4)_2S_2O_3$ 0.2 M, $CuSO_4 \cdot 5H_2O$ 300 mg/L, Ammonia 0.9 M, open air, ambient temperature (22 to 25° C.), no pH adjustment, 3-hours duration. It was found that after 3 hours, the gold extraction rate was 92.8%. The thiosulfate consumption was 7.8 kg per ton of ore.

In experiment 1-2, the leaching solution conditions were: $Na_2S_2O_3$ 0.1 M, $Cuen_2$ 1.2 mM, total EDA 3.6 mM, open air, ambient temperature (22 to 25° C.), no pH adjustment, 3-hours duration. It was found that after 3 hours, the gold extraction rate was 87.7%. The thiosulfate consumption was 2.3 kg per ton of ore.

In experiment 1-3, the leaching solution conditions were: $Na_2S_2O_3$ 0.1 M, $Cuen_2$ 1.2 mM, total EDA 3.6 mM, open air, ambient temperature (22 to 25° C.), no pH adjustment, 6-hours duration. It was found that after 6 hours, the gold extraction rate was 93.2%. The thiosulfate consumption was 2.5 kg per ton of ore.

In experiment 1-4, the leaching solution conditions were: $(NH_4)_2S_2O_3$ 0.1 M, $Cuen_2$ 1.2 mM, total EDA 3.6 mM, open air, ambient temperature (22 to 25° C.), no pH adjustment, 3-hours duration. It was found that after 6 hours, the gold extraction rate was 94.3%. The thiosulfate consumption was 2.6 kg per ton of ore.

In experiment 1-5, the leaching conditions were the same as in experiment 1-3 except that 5 g/L of DOWEX 21K resin was added in the beginning of the leaching process. It was found that almost all of the gold was collected by resin. The loaded resin was analyzed by fire assay method. The gold extraction was 94.5% and the thiosulfate consumption was 2.5 kg per ton of ore.

The foregoing results indicate that under these conditions, the EDA assisted leaching can be slower than the conventional thiosulfate-copper-ammonia leaching. To get a gold extraction rate higher than 92% required only three hours in presence of ammonia. On the other hand, six hours were required for a similar gold extraction in the EDA-assisted leaching system. However, it is also obvious that EDA-assisted leaching was as effective as the conventional thiosulfate-copper-ammonia system in terms of final gold extraction rate. Meanwhile, the thiosulfate consumption in the EDA-assisted system was much lower than that in the conventional thiosulfate-copper-ammonia system, i.e., only 2.5 kg per metric ton of ore.

It was also found that both ammonium thiosulfate and sodium thiosulfate can be used in this leaching system. The gold extractions were similar. However, the total percentage of ammonium thiosulfate consumed was higher than that of sodium thiosulfate. That also means that more polythionate and sulphate were produced in the ammonium thiosulfate solution. It was also found that the adsorption of gold on resin in the EDA system was effective and complete.

Second Study (Sample A): The following are the results of a study on the initial pH in the EDA-assisted leaching system of the invention for Sample A.

The initial pH was adjusted by adding sulfuric acid and sodium hydroxide.

In experiment 2-1, the leaching solution conditions were: $Na_2S_2O_3$ 0.1 M, $Cuen_2$ 1.2 mM, total EDA 3.6 mM, open air, ambient temperature (22 to 25° C.), initial pH 6, 9-hours duration. It was found that after 9 hours, the gold extraction rate was 94.7%. The thiosulfate consumption was 2.9 kg per metric ton of ore.

In experiment 2-2, the leaching solution conditions were: $Na_2S_2O_3$ 0.1 M, $Cuen_2$ 1.2 mM, total EDA 3.6 mM, open air, ambient temperature (22 to 25° C.), initial pH 7.5, 9-hours duration. It was found that after 9 hours, the gold extraction rate was 95.3%. The thiosulfate consumption was 2.7 kg per ton of ore.

In experiment 2-3, the leaching solution conditions were: $Na_2S_2O_3$ 0.1 M, $Cuen_2$ 1.2 mM, total EDA 3.6 mM, open air, ambient temperature (22 to 25° C.), initial pH 8.5, 9-hours duration. It was found that after 9 hours, the gold extraction rate was 95.0%. The thiosulfate consumption was 2.7 kg per ton of ore.

In experiment 2-4, the leaching solution conditions were: $Na_2S_2O_3$ 0.1 M, $Cuen_2$ 1.2 mM, total EDA 3.6 mM, open air, ambient temperature (22 to 25° C.), initial pH 9.5, 12-hours duration. It was found that after 12 hours, the gold extraction rate was 94.3%. The thiosulfate consumption was 2.6 kg per ton of ore.

In experiment 2-5, the leaching solution conditions were: $Na_2S_2O_3$ 0.1 M, $Cuen_2$ 1.2 mM, total EDA 3.6 mM, open air, ambient temperature (22 to 25° C.), initial pH 10.5, 12-hours duration. It was found that after 12 hours, the gold extraction rate was 91.9%. The thiosulfate consumption was 2.4 kg per ton of ore.

In experiment 2-6, the leaching solution conditions were: $Na_2S_2O_3$ 0.1 M, $Cuen_2$ 1.2 mM, total EDA 3.6 mM, open air, ambient temperature (22 to 25° C.), initial pH 11.5, 12-hours duration. It was found that after 12 hours, the gold extraction rate was 90.4%. The thiosulfate consumption was 2.3 kg per ton of ore.

The foregoing results indicate that under these conditions, EDA-assisted leaching is not sensitive to the initial solution pH. Within the range of pH of 6 to 11.5, gold extraction remains at a high level. However, pH higher than 10.5 is not suggested due to the slight drop of gold extraction rate. Within the range (i.e., of pH between about 6 and about 11.5), the initial pH value did not significantly influence the thiosulfate consumption. Low thiosulfate consumption was observed in each of experiments 2-1 to 2-6.

Third Study (Sample B): The following are the results of a comparison study on the traditional thiosulfate-copper-ammonia leaching system and the EDA-assisted leaching system of the invention for Sample B.

In experiment 3-1, the leaching solution conditions were: $(NH_4)_2S_2O_3$ 0.2 M, $CuSO_4.5H_2O$ 300 mg/L, ammonia 0.9 M, open air, ambient temperature (22 to 25° C.), no pH adjustment, 24-hours duration. It was found that after 24 hours, the gold extraction rate was 90.7%. The thiosulfate consumption was 17.8 kg per ton of ore.

In experiment 3-2, the leaching solution conditions were: $Na_2S_2O_3$ 0.1 M, $Cuen_2$ 12 mM, total EDA 36 mM, open air, ambient temperature (22 to 25° C.), no pH adjustment, 24-hours duration. It was found that after 24 hours, the gold extraction rate was 86.6%. The thiosulfate consumption was 7.1 kg per ton of ore.

In experiment 3-3, the leaching solution conditions were: $Na_2S_2O_3$ 0.1 M, $Cuen_2$ 12 mM, total EDA 36 mM, open air, ambient temperature (22 to 25° C.), no pH adjustment, 36-hours duration. It was found that after 36 hours, the gold extraction rate was 93.3%. The thiosulfate consumption was 8.3 kg per ton of ore.

In experiment 3-4, the leaching solution conditions were: $(NH_4)_2S_2O_3$ 0.1 M, Cuen2 12 mM, total EDA 36 mM, open air, ambient temperature (22 to 25° C.), no pH adjustment, 36-hours duration. It was found that after 36 hours, the gold extraction rate was 93.2%. The thiosulfate consumption was 10.5 kg per ton of ore.

In experiment 3-5, the leaching conditions were the same as the experiment 3-3 except that 5 g/L of DOWEX 21K resin was added in the beginning of the leaching process. It was found that 100% of gold was collected by resin. The loaded resin was analyzed by fire assay method. The gold extraction was 93.9% and the thiosulfate consumption was 8.0 kg per ton of ore.

The foregoing results indicate that under these conditions, the leaching rate of the EDA-assisted system of the invention is slower than the conventional thiosulfate-copper-ammonia system. However when longer duration time was allowed, similar or higher gold extractions were received in the EDA system of the invention. Both ammonium and sodium thiosulfate were used in the leaching tests. Similar gold extractions were received. However, the use of ammonium thiosulfate resulted in a higher percentage of thiosulfate decomposition. Resin exchange recovery of gold was proved to be effective and complete.

Fourth Study (Sample C): The following are the results of a comparison study on the traditional thiosulfate-copper-ammonia leaching system and the EDA-assisted leaching system of the invention for Sample C.

Except experiment 4-1, all the rest of the following experiments needed pulp pH neutralizations at the beginning of the leaching process. The neutralization was done by adding sodium hydroxide.

In experiment 4-1, the leaching solution conditions were: $(NH_4)_2S_2O_3$ 6 g/L, $CuSO_4.5H_2O$ 130 mg/L, ammonia 0.04 M, open air, 50° C., no pH adjustment, 8-hours duration. It was found that after 24 hours, the gold extraction rate was 94.2%. The thiosulfate consumption was 2.4 kg per ton of ore.

In experiment 4-2, the leaching solution conditions were: $(NH_4)_2S_2O_3$ 6 g/L, $Cuen_2$ 0.6 mM, total EDA 2.4 mM, open air, 50° C., 7.4, 8-hours duration. It was found that after 8 hours, the gold extraction rate was 94.9%. The thiosulfate consumption was 2.4 kg per ton of ore.

In experiment 4-3, the leaching solution conditions were: $Na_2S_2O_3.5H_2O$ 10 g/L, $Cuen_2$ 0.6 mM, total EDA 2.4 mM, open air, 50° C., pH 7.78, 8-hours duration. It was found that after 8 hours, the gold extraction rate was 94.1%. The thiosulfate consumption was 2.6 kg per ton of ore.

In experiment 4-4, the leaching conditions were the same as the experiment 4-3 expect that 5 g/L of DOWEX 21K resin was added in the beginning of the leaching process. It was found that 100% of gold was collected by resin. The loaded resin was analyzed by fire assay method. The gold extraction was 95.2% and the thiosulfate consumption was 2.6 kg per ton of ore.

The foregoing results indicate that under these conditions, the gold extraction is about the same for both the thiosulfate-copper-ammonia system and the EDA-assisted system of the invention. The use of ammonium thiosulfate in the EDA-assisted system led to a higher molecular quantity of thiosulfate consumption. Resin exchange was proved to be an effective gold recovery method in the EDA system.

Fifth Study (Sample A with additional minerals): The following are the results of a comparison study on the traditional thiosulfate-copper-ammonia leaching system and the EDA-assisted leaching system of the invention for Sample A with additional minerals.

Sample A (with additional minerals) was used in these leaching tests. It was reported in the literature (i.e., in the prior art) that in the thiosulfate-copper-ammonia system, the presence of pyrite, pyrrhotite and certain copper sulfide minerals may lead to a lower gold extraction rate and much higher thiosulfate consumption. Therefore, in this group of tests, some natural minerals provided by a commercial supplier were added in the silicate ore (i.e., Sample A) so that the effects of these minerals on both leaching systems can be compared.

In experiment 5-1, the leaching solution conditions were: $(NH_4)_2S_2O_3$ 0.2 M, $CuSO_4.5H_2O$ 300 mg/L, ammonia 0.9 M, open air, ambient temperature, no pH adjustment, additional pyrite: 8% of total solid, 3-hours duration. It was found that after 3 hours, the gold extraction rate was 86.9%. The thiosulfate consumption was 16.7 kg per ton of ore.

In experiment 5-2, the leaching solution conditions were: $(NH_4)_2S_2O_3$ 0.2 M, $CuSO_4.5H_2O$ 300 mg/L, ammonia 0.9 M, open air, ambient temperature, no pH adjustment, additional natural pyrrhotite: 8% of total solid, 3-hours duration. It was found that after 3 hours, the gold extraction rate was 91.5%. The thiosulfate consumption was 12.1 kg per ton of ore.

In experiment 5-3, the leaching solution conditions were: $Na_2S_2O_3$ 0.1 mol/L, $Cuen_2$ 20 mM, total EDA 60 mM, open air, ambient temperature (22-25° C.), no pH adjustment, additional pyrite: 8% of total solid, 24-hours duration. It was found that after 24 hours, the gold extraction rate was 91.9%. The thiosulfate consumption was 9.9 kg per ton of ore.

In experiment 5-4, the leaching solution conditions were: $Na_2S_2O_3$ 0.1 mol/L, $Cuen_2$ 20 mM, total EDA 60 mM, open air, ambient temperature (22-25° C.), no pH adjustment, additional natural pyrrhotite: 8% of total solid, 24-hours duration. It was found that after 24 hours, the gold extraction rate was 93.7%. The thiosulfate consumption was 5.4 kg per ton of ore.

The foregoing results indicate that under these conditions, significant amounts of iron sulfides resulted in lower gold extraction rates and much higher thiosulfate consumptions in the thiosulfate-copper-ammonia system. However, in EDA-assisted system of the invention, the effect of introducing these minerals is much less significant. In the EDA-assisted system, the gold extractions were not significantly affected and the thiosulfate consumption was 10 kg/ton or lower.

Summary—Conclusions Based on Experimental Results

Based on experimental results, it is concluded that the advantages of the EDA-assisted system of the invention over the prior art cyanidation process include at least: the EDA-assisted system is less harmful to the environment and to human health, and also is capable of treating carbonaceous gold ores and copper-bearing gold ores efficiently and economically. Without being bound to a particular theory, a contributing factor to the efficiencies and economics may be the oxidative levels in the leaching liquors disclosed herein. The oxidation states are maintained at sufficiently low levels so that waste materials such as carbonaceous materials are not oxidized. If oxidative levels are too high, a complexing agent such as thiosulfate, by way of non-limiting example, will be oxidized first and substantially completely. The premature consumption of complexing agents such as thiosulfate would render the leaching liquor ineffective for extracting ore with sufficient yield, purity and processability. For at least these reasons, the time and expense associated with pre-treatment of ore containing carbonaceous materials or other waste material may be avoided by using the methods and materials disclosed herein.

The advantages of the EDA-assisted system of the invention over the conventional thiosulfate-copper-ammonia system include at least: lower thiosulfate consumption; lower polythionates and sulphate production; lower or no ammonia; lower sensitivity to initial pulp pH; and lower sensitivity to the harmful iron sulfide minerals.

It is also recognized that the EDA-assisted system is generally somewhat slower in its leaching rate than the conventional thiosulfate-copper-ammonia system with moderate reagent concentrations. Accordingly, allowing a somewhat longer duration time might be advisable for the EDA-assisted system.

It appears that EDA stabilizes the solutions and chemicals. In this sense, EDA does not "replace" ammonia (i.e., if the thiosulfate-EDA-Cu ion system is compared to the thiosulfate-copper-ammonia leaching system of the prior art).

Both ammonium thiosulfate and sodium thiosulfate reagents can be used in the EDA-assisted system of the invention. However, it is noted that using ammonium thiosulfate may lead to a higher percentage of thiosulfate decomposition. The presence of free ammonia, either additional or generated from ammonium anion is allowed in the process of the invention, but not a necessary requirement of the process of the invention herein. In any event, as noted above, ammonia tends to eventually appear in recycled solution because ammonia is one of the decomposition products of EDA.

Any element in a claim that does not explicitly state "means for" performing a specified function, or "step for" performing a specific function, is not to be interpreted as a "means" or "step" clause as specified in 35 U.S.C. §112, paragraph 6.

It will be appreciated by those skilled in the art that the invention can take many forms, and that such forms are within the scope of the invention as claimed. Therefore, the spirit and scope of the appended claims should not be limited to the descriptions of the preferred versions contained herein.

We claim:

1. A process for extracting gold from a gold-bearing ore, the process comprising:
   (a) providing a leaching liquor comprising thiosulfate anion;
   (b) adding dissolvable copper and ethylenediamine to the leaching liquor;
   (c) contacting the leaching liquor with the gold-bearing ore, to form a pregnant leach solution comprising gold dissolved from the gold-bearing ore; and
   (d) recovering at least part of said gold from the pregnant leach solution.

2. A process according to claim 1 in which the leaching liquor additionally comprises dissolved copper ion.

3. A process according to claim 1 in which the concentration of thiosulfate in the leaching liquor is between about 0.001 mol/liter and about 0.5 mol/liter.

4. A process according to claim 2 in which the concentration of copper in the leaching liquor is between about 0.00001 mol/liter and about 0.05 mol/liter.

5. A process according to claim 2 in which the ratio of ethylenediamine to copper is about 3:1.

6. A process according to claim 1 in which the leaching liquor has a pH of at least about 6.

7. A process according to claim 1 in which step (d) additionally provides a recycle leach solution.

8. A process according to claim 7 additionally comprising:
   (e) contacting the recycle leach solution with the gold-bearing ore.

9. A process according to claim 1 wherein the ore comprises at least one waste material.

10. A process according to claim 9 wherein at least one waste material is carbonaceous.

11. A process according to claim 10 wherein the leaching liquor does not oxidize carbonaceous materials.

12. A process according to claim 10 wherein the leaching liquor does not completely oxidize carbonaceous materials.

13. A process for extracting gold from a gold-bearing ore, the process comprising:
   (a) providing a leaching liquor comprising thiosulfate anion;
   (b) adding dissolvable copper and ethylenediamine to the leaching liquor;
   (c) providing an ion exchange resin;
   (d) contacting the leaching liquor and the ion exchange resin with the gold-bearing ore to form a loaded resin comprising gold dissolved from the gold-bearing ore;
   (e) screening the leaching liquor and the loaded resin to separate the leaching liquor and the loaded resin; and
   (f) recovering at least part of said gold from the loaded resin.

14. A process according to claim 13 in which step (f) additionally provides a recycle ion exchange resin.

15. A process according to claim 14 additionally comprising:
   (g) contacting the leaching liquor and the recycle ion exchange resin with the gold-bearing ore.

16. A process for extracting gold from a gold-bearing ore, the process comprising:
   (a) providing a leaching liquor comprising copper ion and thiosulfate anion;
   (b) adding dissolvable copper and ethylenediamine to the leaching liquor;
   (c) contacting the leaching liquor with the gold-bearing ore to form a pregnant leach solution comprising gold dissolved from the gold-bearing ore; and
   (d) recovering at least part of said gold from the pregnant leach solution.

17. A process according to claim 16 in which the concentration of thiosulfate in the leaching liquor is between about 0.001 mol/liter and about 0.5 mol/liter.

18. A process according to claim 16 in which the ratio of ethylenediamine to copper is about 3:1.

19. A process according to claim 16 in which the leaching liquor has a pH of at least about 6.

20. A process according to claim 16 in which step (d) additionally provides a recycle leach solution.

21. A process according to claim 20 additionally comprising: (e) contacting the recycle leach solution with the gold-bearing ore.

22. A process for extracting gold from a gold-bearing ore, the process comprising:
   (a) providing a leaching liquor comprising thiosulfate anion and ammonia;
   (b) adding dissolvable copper and ethylenediamine to the leaching liquor;
   (c) contacting the leaching liquor with the gold-bearing ore, to form a pregnant leach solution comprising gold dissolved from the gold-bearing ore; and
   (d) recovering at least part of said gold from the pregnant leach solution.

23. A process for extracting gold from a gold-bearing ore, the process comprising:
   (a) providing a leaching liquor comprising copper ion, thiosulfate anion, and ammonia;
   (b) adding dissolvable copper and ethylenediamine to the leaching liquor;
   (c) contacting the leaching liquor with the gold-bearing ore to form a pregnant leach solution comprising gold dissolved from gold-bearing ore; and
   (d) recovering at least part of said gold from the pregnant leach solution.

24. A process according to claim 23 in which the ratio of ethylenediamine to copper is about 3:1.

* * * * *